March 31, 1970 M. W. HALL 3,504,079
PROCESS OF FORMING MOLDS AND SHOE SOLES IN SITU
Original Filed July 28, 1965 2 Sheets-Sheet 1
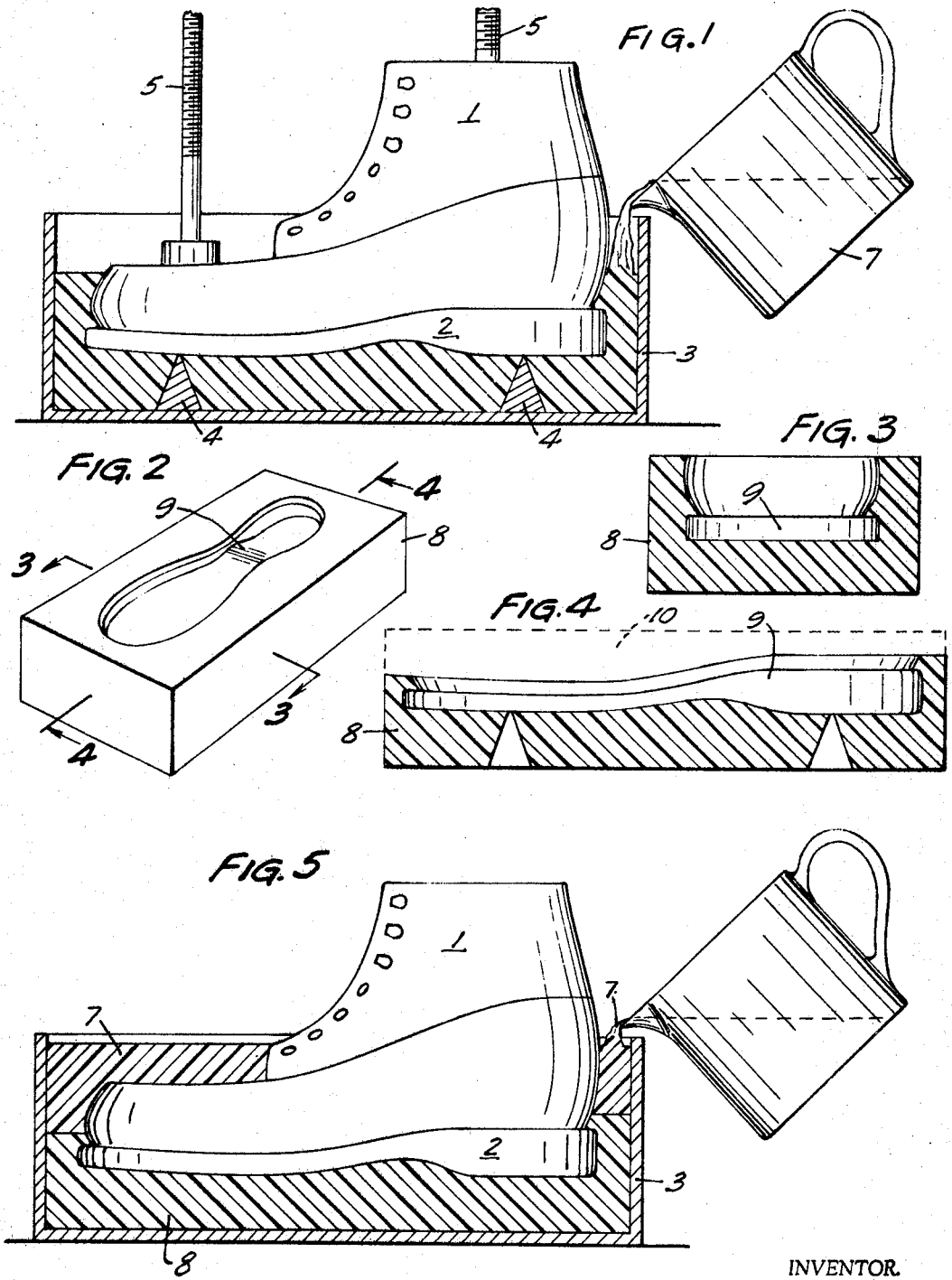
INVENTOR.
MYRON W. HALL
BY
Carpenter, Kinney & Coulter
ATTORNEYS

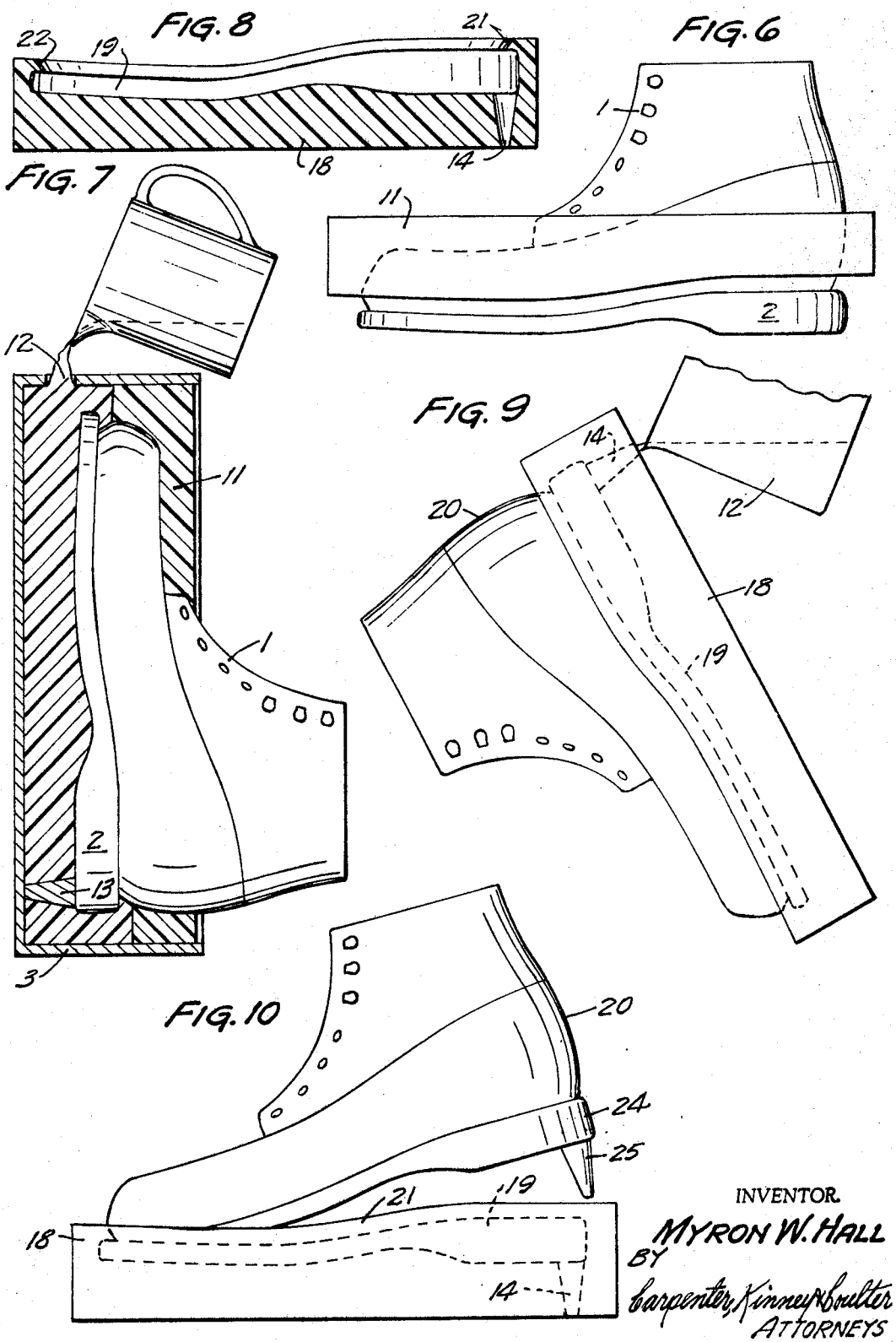

United States Patent Office 3,504,079
Patented Mar. 31, 1970

3,504,079
PROCESS OF FORMING MOLDS AND
SHOE SOLES IN SITU
Myron W. Hall, Sunfish Lake, Minn., assignor to Minnesota Mining & Manufacturing Company, St. Paul, Minn., a corporation of Delaware
Original application July 28, 1965, Ser. No. 475,334. Divided and this application Mar. 28, 1968, Ser. No. 721,553
Int. Cl. B29h 7/08
U.S. Cl. 264—225                    6 Claims

ABSTRACT OF THE DISCLOSURE

Method for forming molds and shoe soles in situ in which a mold formed from a single cast elastomeric polyurethane piece having an opening on one side with an inwardly projecting lip encircling the opening to support a shoe upper placed over the mold, liquid polyurethane-forming reaction mixture being cast into the cavity, hardened at a low temperature and then stripped from the mold, encircling lip being sufficiently flexible to permit stripping of shoe from mold without tearing away of sole.

---

This application is a division of application Ser. No. 475,334 filed July 28, 1965, now abandoned.

This invention relates to methods for making elastomeric soled shoes.

The traditional method of shoe manufacture involves formation of a lasted shoe upper having a welt thereon to which the sole is affixed by stitching. As this method involves costly and time consuming hand labor, many alternative procedures have been developed.

One alternative procedure involves eliminating the welt and instead adhesively attaching a preformed sole to the upper. Adhesion problems are inherent in this method and many steps are still required in the combined processes of separately forming the uppers and soles followed by bonding the same together.

Another alternative method is the direct or in situ molding of soles onto uppers. At least two variants of in situ molding have been employed commercially. One involves vulcanizing a rubbery composition directly onto the shoe upper and the other involves injection molding a plastic composition onto the shoe upper. Both of these procedures require high temperatures and pressures in their practice. Both procedures necessitates removal of the shoe uppers from the wooden lasts around which they are formed and remounting of the upper on special metal lasts which are capable of withstanding the temperatures and pressures required by the molding procedures. In addition to the special lasts, multi-sectioned rigid sole-forming molds must be used. Conventionally these molds have three major parts; a bottom portion and two side portions. These parts are held together in assembled relation by expensive complex machinery while the soles are molded. Representative molds of this type are shown in U.S. Patent No. 2,956,313, issued to Choice, Oct. 18, 1960, U.S. Patent No. 2,976,624 issued to Rollman, Mar. 28, 1961, and U.S. Patent No. 3,189,943 issued to Choice et al., June 22, 1965. These molds are formed by various procedures known to the metal working arts. The dies are expensive, prohibitively so, in the case of low volume shoe lines.

The temperatures used in vulcanizing rubber and/or melting a resin such as polyvinyl chloride in injection molding, often must be in the range of 300° F. to 450° F. These high temperatures inherently limit the kinds of materials which can be used for shoe uppers upon which soles could heretofore be molded in situ. Some leather substitutes are severely damaged under these conditions and adverse effects have been observed in natural leather.

The present invention provides a commercially feasible in situ shoe sole casting system which uses an extremely low-cost, one piece flexible mold that can be readily made by a simple casting procedure.

In comparison with known systems for in situ shoe sole molding, which require molds having a cost measured in thousands of dollars, the molds used in the method of the present invention can be made at a cost of only a few dollars. The invention in addition eliminates many of the costly procedures previously required in the manufacture of shoes having molded in place rubbery soles. In the practice of this invention, the shoe uppers need not be removed from the wooden lasts over which they are formed and the soles may be cast in place thereon my means of a simple one-step casting procedure using a liquid sole-forming material which cures at low temperatures in a short time to form a tenaciously adhering tough elastomeric sole on the shoe uppers. After a period of only minutes the soled shoe easily can be stripped from the mold without disassembling the mold, and the mold is ready for re-use. Because of the low molding temperatures and pressures used in practicing the invention, the shoe uppers can be formed from any suitable material including heat-sensitive leather substitutes which could not previously be used in in situ sole molding processes.

The one piece molds used in practicing the invention are provided with novel elastomeric lips which perform the dual function of supporting the shoe uppers in place over the mold cavity during molding and also form a molding surface which shapes the exposed upper surfaces of the shoe soles. The molds are further provided with means to urge the sides thereof into esaling engagement with a shoe upper, the means being releasable to permit easy removal of the soled shoe upper from the mold.

Shoe soles are formed in accordance with the invention from an elastomer cured in situ from liquid reaction components at low temperatures. Since these liquid components can partly penetrate the shoe upper materials prior to formation of the final rubbery polymer, it is believed that hitherto unobtained bond strengths are formed between the upper and the sole. The shoe soles have exceptional abrasion and cut-growth resistance.

The invention will be further described with reference to the accompanying drawings wherein, FIGURE 1 is a cross-sectional view showing the first step in the process of making a mold of a kind useful in the practice of the present invention;

FIGURE 2 is a perspective view of an elastomeric matrix having a shoe bottom imprint therein;

FIGURE 3 is a cross-sectional view taken along line 3—3 of FIGURE 2;

FIGURE 4 is a cross-sectional view taken along line 4—4 of FIGURE 2 after a trimming operation has been performed on the matrix;

FIGURE 5 is a cross-sectional view illustrating a further step in the preferred mold-making sequence;

FIGURE 6 is a side view of a model used for forming the mold;

FIGURE 7 is a cross-sectional view showing the step of making a mold using the model of FIGURE 6;

FIGURE 8 is a cross-sectional view taken along the longitudinal axis of the mold formed in FIGURE 7;

FIGURE 9 is a side view showing the formation in situ of a sole on a shoe upper in accordance with the invention;

FIGURE 10 is a side view showing the stripping of a shoe from a mold.

Referring now more particularly to the drawings, there is seen in FIGURE 1, a shoe 1 of a size and style for which it is desired to produce a mold for casting of soles in situ. Shoe 1 has a sole portion 2 thereon of the desired design. Shoe 1 is shown in position in a form or chase 3 spaced above the bottom of the chase by supports 4. Positioning means 5 supported by suitable supporting means (not shown) are used for positioning shoe 1 accurately in chase 3. The bottom of shoe 1 is coated with a parting agent such as oil, wax, or preferably a silicone or siloxane resin. A liquid reaction mixture 7 is poured into chase 3 to a depth extending somewhat above the top of sole 2. The liquid reaction mixture hardens within a short time to form an elastomeric matrix 8 which is shown in FIGURES 2 and 3 stripped away from shoe 1. An imprint or "surface negative" 9 of the lower portion of the shoe is formed in matrix 8. As shown in FIGURE 4 matrix 8 is trimmed by cutting away the upper portion 10 thereof along a plane parallel to and slightly above the top of the portion of imprint or cavity 9 which corresponds to the top of sole 2.

After the trimming operation, matrix 8 is placed back on shoe 1. A parting agent is coated on the top surface of matrix 8 and the shoe 1 and matrix 8 are again positioned in chase 3. Additional liquid reaction mixture 7 is poured into chase 3 above matrix 8 to embed a part of the shoe upper therein. After the additional reaction mixture has hardened shoe 1 and the matrix portions are again removed from chase 3 and matrix 8 is again stripped away from the bottom of the shoe to leave the shoe embedded in an elastomeric slab 11 as shown in FIGURE 6. The shoe thus embedded in slab 11 forms an accurate model from which any number of molds can be formed for use in practicing the invention.

As shown in FIGURE 7 shoe 1 and elastomeric slab 11 are again positioned in a chase 3 as shown to form a cover portion therefor. Prior to placing the same in the chase the bottom portions of shoe 1 and slab 11 are coated with a release or parting agent. The chase is positioned in an upright position as shown and a liquid reaction mixture 12 of a different composition as hereinafter specified is cast through an opening in the end thereof. The upright orientation of the chase minimizes the inclusion of bubbles in mold 18 formed from the cast reaction mixture. A mold insert 13 is positioned in the chase to form a sprue opening 14 in mold 18.

The reaction mixture cures or hardens to form a tough elastomeric mold 18 free of bubbles and other imperfections and having a cavity 19 therein which is in accurate detail a surface negative of sole 2. The preferred soling resins harden within a matter of minutes. In addition the top of mold 18 has a contour similar and parallel to the bottom of a lasted shoe upper 20 which is similar to the upper portion of shoe 1. A lip 21 is formed which encircles the perimeter of the mold cavity; preferably the lip edge is beveled as at 22 to provide an upper beveled surface terminating in a sharp edge. The undersurface of the lip 21 conforms to the upper surface of sole 2. The beveled upper surface 22 of lip 21 matches the contour of that portion of the bottom of shoe 1 which rests thereagainst so that a lasted shoe upper 20 conforming to shoe 1 will nest snugly in the beveled mold cavity opening.

In using a mold 18 to form shoe soles as shown in FIGURE 9, the cavity 19 is coated with a suitable, e.g. silicone, release agent. A lasted shoe upper 20 is positioned on lip 21 to close mold cavity 19 and, if desired, a seal prepared from, for example, wax or hot melt, is applied around the periphery of the shoe upper to tightly seal the cavity. It is preferred that the mold be provided with clamping means which force the sides of the mold inwardly into sealing engagement with the shoe upper. The clamping means can be any suitable device which applies forces inwardly from the opposite sides of the mold to push it against the sides of the shoe upper. A preferred clamping device is a contractible metal band which surrounds the mold. The mold is then preferably of an oval shape so that the compressive forces produced by tightening the band are directed radially inward toward the shoe upper. The band is releasable to facilitate removal of the shoe upper from the mold. The band can be provided with, for example, a toggle means or equivalent device for expansion and contraction thereof. The upper can be held in place by any suitable clamping means such as C clamps or the like which holds the upper down over the cavity so that the assembled mold and shoe upper can be placed in a nearly upright position such as shown in FIGURE 9 for casting of the sole in situ on the upper. The upright orientation minimizes the entrapment of air in the cavity and thus eliminates bubbles. A castable liquid reaction mixture 12 which may, if desired, be of the same composition as mold 18 is then poured through opening 14 in the end of the mold. The liquid reaction mixture sets in a short time to form a tough rubbery elastomer. Curing can be accelerated by heating the assembled mold, shoe upper and reaction mixture in an oven at moderate temperatures, typically at 150° F. Prolonged exposure to temperatures substantially in excess of 150° F. should be avoided because degradation of the mold and sole materials as well as some shoe upper materials may occur.

After sufficient curing to form a shape stable sole 24, the shoe is stripped from the mold simply by grasping the heel portion by hand and pulling. The elastomeric lip, and the elastomeric sole flex sufficiently to permit easy removal of the soled shoe from the mold. A sprue piece 25, removed along with the shoe, is subsequently cut off. The sprue opening 14 in the mold is preferably large enough to allow the escape of air therethrough during filling of the mold. Five-eighths inch diameter has been found suitable. Removal of the sprue piece is facilitated by tapering the sprue opening in the mold so that it widens inwardly. After cutting away the sprue portion 25 the shoe is in a finished condition suitable for wearing.

The preferred low temperature curing elastomeric compositions for use in making the molds of the present invention and for forming shoe soles in situ are tough, tear and abrasion resistant, dimensionally stable, crosslinked polyurethane elastomers. Such compositions are the reaction products of certain liquid reaction mixtures of organic isocyanates, polyalkylene ether polyols and aromatic diamines. These reaction mixtures form polyurethane rubber elastomers in a single-stage continuous curing cycle with little or no added heat when reacted with one another in the presence of any one, or combination of more than one, of polyol-soluble organic compounds of certain polyvalent metals, e.g. tin, lead and mercury. As a practical consideration, organo-mercuric compounds alone, or combined with organic lead salts are much preferred as these appear to catalyze the reaction even in the presence of moisture without undue side reactions. Thus it is possible to operate under normally occurring ambient humidity conditions and with upper materials containing slight amounts of moisture.

In order to form by single-stage reaction a completely reacted elastomer, the isocyanates and active hydrogen-containing constituents should be present in approximately stoichiometric amounts, i.e., the ratio of NCO groups to active hydrogens should be between about 0.95:1 to 1.15:1. By "active hydrogen" is meant hydrogen which displays activity according to the Zerewitinoff test described in J.A.C.S. 49, 3181 (1927). Preferably, the NCO and hydrogen containing reactants are prepared as separate parts of a two-part mixture. It will be understood that a portion of the active hydrogen containing constituents, e.g. a polyalkylene ether glycol, may be added to the isocyanate part of the two-part system in order to improve and to increase the molecular weight of the NCO terminated material thereby reducing the toxicity and moisture sensitivity of the same prior to mixing with the other reactants. The other part of the two-part system preferably contains the remainder of the active hydrogen-containing material which is preferably a mixture of polyalkylene ether glycol, polyalkylene ether triol, and an aromatic diamine such as 4,4' methylene bis-2-chloroaniline. The resulting rubber is a tough, durable, cut-growth resistant material which provides an ideal rubber shoe sole and tough, durable, reusable molds.

The preferred reactive mixture thus contains five major components in variable ratios; glycol, triol, diamine, isocyanate and catalyst. Fillers and pigments may also be added to alter the final properties, to provide distinctive colors, to aid in machinability or to reduce cost.

As noted, the preferred catalysts for causing the reactive mixtures of the present invention to cure at low temperatures are organic compounds of lead and mercury or mixtures thereof. In addition, lead oxide, while not in itself catalytic, when present in small amounts, has been found to enhance the catalytic activity of the organo-metallic compounds and reduce the cost of the catalyst system. This effect of lead oxide is further enhanced by the addition of small amounts of organic calcium salts, for example, calcium octoate. Specifically the preferred catalysts are the organo-mercuric compounds containing in addition to a C—Hg bond, an Hg—O— bond, e.g., phenyl mercuric acetate, phenyl mercuric hydroxide, and the lead salts of monocarboxylic acid, e.g., lead octoates (including lead 2-ethyl hexoate) and lead naphthenate. These catalysts, and preferably mixtures thereof, cause the urethane elastomer forming systems to cure rapidly at temperatures below 150° F. (65° C.).

In the absence of the metallic catalyst, the castable formulations of the present invention will not adequately cure either at room temperature or at elevated temperatures. The OH—NCO reaction is quite slow and at elevated temperatures side reactions involving the isocyanate group takes place preferentially. While as little as 0.05 percent by weight of the reaction mixture of the more active metallic catalyst, in the form of organo-metallic compound or metallic salts, will result in a resin that can be cured at temperatures of 100–150° F. in due time. 0.1 percent is the preferred lower limit. If more than 1 percent of metal is present the resins tend to gel too fast and result in poor castings. 0.6 percent is the preferred upper limit.

The component of the reactive compositions which must be most carefully selected is the diol or glycol. This meterial must be sufficiently high in molecular weight to provide the necessary flexibility to the polymer chain. Useful polyalkylene ether glycols in the practice of the invention are those glycols and glycol mixtures which may be structurally represented by the idealized formula H(OR—OR')$_n$OH, wherein R and R' are the same, or different, alkylene radicals each containing at least 3 carbon atoms and preferably arranged to provide predominantly secondary hydroxyl terminal groups in the resultant polyether polymer, these alkylene radicals represent the polymeric chain forming portions of the starting polyols and/or alkylene oxides from which the polyether glycol is formed; and, $n$ is an integer sufficiently large to provide a glycol or glycol mixture having an average molecular weight between about 750 and 4,500 and preferably to provide a liquid glycol or glycol mixture having and average molecular weight between about 1,000 and 2,000. While in the idealized formula, R and R' are indicated as being present in equal amounts in a predictably alternating fashion, it is more likely that one or the other will predominate and that the fashion in which they link together in the polyether chain is not so predictable; consequently, the structural representation should be looked at primarily as a visual aid in the comprehension of the polymer structure, rather than as a limiting structural formulation.

Optimum elastomer properties are achieved by using polyoxypropylene diols or triols formed by chain extending a monomeric diol or triol with propylene oxide to form polyethers terminated principally with secondary hydroxyl groups.

The triol added to cause crosslinking of the reactive mixture may be a trihydric terminated polyalkylene ether polyol such as trimethylol propane or glycerol or other triol chain-extended with propylene oxide or higher alkylene oxides. Also, of course, monomeric triols such as glycerol, 1,2,6-hexane triol, trimethylol propane etc. can be added to the reaction mixture in lieu of or in combination with the polymeric triols. Whether polymeric or monomeric, the triol can be added to either, or both parts of the reactive mixture. As previously noted, some diol or triol is usually pre-reacted with the diisocyanate.

The triol is necessary to provide a reasonably rapid rate of gelation and a tough elastomer having low cold flow and good heat resistance. If the amount of triol is too low, poor curing and inadequate physical properties result. If the amount is too high the product has poor tear resistance and decreased elongation. The useful molecular weight range varies from about 90 to about 6,000. The ratio may vary from as much as one gram mole of triol (one crosslink) to 5,000 grams of final resin mixture to as little as one gram mole (one crosslink) to 100,000 grams of final resin. The higher the diamine content of the composition, the lower the optimum crosslink content will be. The preferred range is for most formulations between 1:10,000 and 1:50,000 grams of total resin.

The diamine component of the reaction mixture provides tear strength, hardness and tensile strength. Too low a level will provide a resin deficient in these properties, while too high a ratio will result in a boardy, plastic resin rather than the desired elastomers. If less than 10 percent of the total active hydrogen provided by the sum of diol, triol and diamine, is provided by the diamine, the elastomer will generally be too weak. If more than 50 percent of the active hydrogen is provided by the diamine, the resin will be too hard. The preferred range falls in 15–30 percent region, the preferred diamine is 4,4' methylene bis 2-chloroaniline. Various other aromatic cyclo-aliphatic and heterocyclic diamines such as p-xylylenediamine, 1,4-diaminocyclohexane, p-phenylenediamine, 1-methyl-2,4-diaminobenzene, bis(p-aminocyclohexyl)methane, N,N'-dimethyltetramethylenediamine, N,N'-dimethylphenylenediamine, N,N'-dimethyl-p-xylylenediamine, N,N'-dimethyl-1,4-diaminocyclohexane, piperazine, trans-2,5-dimethylpiperazine, 4,4'-methylene bis(2-carbomethoxyaniline), 4,4'-diaminodiphenyldisulfide can be used. Other suitable diamines will be apparent to those skilled in the art. The diamine should be present in an amount sufficient to provide about from 10 to 50 percent, and preferably 15 to 30 percent of the active hydrogen in the system. More than this amount will tend to produce a too rigid polymer while less than this amount will produce a polymer having poor abrasion resistance.

Organic polyisocyanates and particularly the various aliphatic and aromatic diisocyanates, are useful in the practice of this invention. Representative of such diisocyanates are hexamethylene diisocyanate, naphthalene-1, 5-diisocyanate, para-phenylene diisocyanate, tolylene diisocyanate, or mixtures of these diisocyanates. Because of its ready availability and the fact that it is a liquid at room temperature, a mixture of the 2,4- and 2,6-tolylene diisocyanate isomers is preferred in the practice of this invention.

The isocyanate content of the mixture must be carefully controlled. If too little is present the polymer will not cure. If too much is present undesirable side reactions will take place, resulting in bubbling and prolonged aftercure. While a truly stoichiometric ratio of active hydrogen to isocyanate is desired, some allowance generally is made for adventitious moisture in the air, on the mold surface, and in the shoe upper and insole construction. The preferred range has been established at 0.95:1.0–1.15:1.0 isocyanate:active hydrogen.

The composition used in the preliminary steps of forming the mold, particularly the liquid reaction mixture identified by numeral 7 in the accompanying drawings, can be a composition other than that used for the soles. For example, a useful elastomer can be made without the diamine and by loading with a cheap clay filler to provide bulk without undue cost. Such a composition forms an easily abradable elastomer, more suitable for use in the mold-forming procedure.

It will be understood that the matrix shown in FIGURE 4 could be used as a mold in place of that shown in FIGURE 8 if sufficient care were used in its formation; however, for accuracy of shape and detail, the procedure outlined hereinbefore is followed in mold formation. It will of course be necessary to use a reaction mixture providing the toughness required to produce a mold which can be used repeatedly.

The invention will be further explained with reference to the following example. All parts are by weight unless otherwise noted:

EXAMPLE

A shoe-forming mold was formed following the steps set forth in the drawings. Reaction mixture 7 consisted of the following Parts A and B which were mixed together in the proportion of 100 parts Part A and 14 parts Part B shortly before casting in the chase 3 to form cast 8.

Part A

| | Parts |
|---|---|
| Polypropylene glycol 2000 M.W. | 42.6 |
| Glycerine based polypropylene ether triol 1500 M.W. | 36.0 |
| PbO | 0.6 |
| Iron oxides (pigment—"Mapico Brown") | 1.5 |
| Kaolin (filler—Huber "Hi-White") | 67.5 |
| Lead 2-ethyl hexoate | 0.3 |
| Calcium 2-ethyl hexoate | 0.6 |
| 2,6 di-tert-butyl-4-methylphenol (antioxidant) | 0.6 |
| Phenyl mercuric acetate | 0.3 |

Part B

| | Parts |
|---|---|
| Tolylene diisocyanate | 129.5 |
| Dipropylene glycol | 29.0 |

The mixture hardened to an elastomeric body at room temperature and was removed from the chase about one-half atfer casting. The matrix was then stripped from the shoe, trimmed as shown in FIGURE 4 and ground smooth. The part of the shoe immersed in the casting had previously been treated with a silicone release agent (Dow Corning Silicone DC-7) to enable release from the matrix. The shoe used as a pattern was then inserted in the elastomeric casting 8, placed in the chase 3, and elastomeric slab 11, of the same composition as the casting 8, poured thereover. After hardening of slab 11 with the upper of the pattern shoe embedded therein, the slab and shoe were removed from the chase. The resulting mold form consisting of the pattern shoe embedded in slab 11 was then used to form a shoe sole forming mold 18 by the procedure illustrated in FIGURE 7 from a two-part reaction mixture which consisted of the following Parts A and B. These parts were mixed in a ratio of 3.4 parts A for each part B.

Part A

| | Weight parts |
|---|---|
| Polypropylene ether glycol (2000 M.W.) | 356 |
| PbO | 1.2 |
| Silica (Cab-O-Sil) | 16 |
| 4,4' methylene bis 2-chloroaniline | 21.6 |
| Calcium 2-ethyl hexoate | 1.2 |
| Phenyl mercuric acetate | 2.4 |
| 2,6-di-tert-butyl-4-methylphenol | 1.6 |

Part B

| | Weight parts |
|---|---|
| Tolylene diisocyanate | 62.3 |
| Polypropylene ether glycol (400 M.W.) | 31.4 |
| Polypropylene ether triol (400 M.W.) | 6.3 |

The mixture was converted to a solid, completely reacted, elastomer in 30 minutes at 150° F., after which it was removed from the chase. The resulting mold was mounted on a mold frame as illustrated in FIGURE 9 and used to cast shoe soles directly onto a wooden lasted upper by use of a reaction mixture identical to that which was used to form the mold. An iron oxide pigment was added to impart a dark brown color. The reaction mixture was again cured for 30 minutes at 150° F. The shoe soles thus formed were tough, elastomeric, abrasion and cut-growth resistant and had a Shore A hardness of 62.

What is claimed is:

1. A method of molding shoe soles in situ on lasted shoe uppers with an elastomeric mold comprising:
   forming an elastomeric mold from (a) a mold form having a shoe sole-shaped portion comprising the bottom of the sole, the edges thereof, and a peripheral portion of the top of the sole around the sole perimeter, and (b) a liquid polyurethane composition curable at less than 150° F., said forming being carried out by immersing said form in said liquid mixture so that said mixture covers the peripheral portion of the top of said sole of said mold form, then curing said mixture to a dimensionally stable state to provide a mold having an inwardly projecting flexible lip encircling the perimeter of the resulting shoe sole-shaped mold cavity of the said mold, said mold, said flexible lip and the portion of the said mold surrounding said cavity thus being of one, unitary cast piece,
   closing said cavity with a lasted shoe upper, the outer periphery of said upper resting on said lip,
   introducing a liquid polyurethane composition curable at less than 150° F. into the resulting closed cavity,
   curing said composition to form a tough rubbery shoe sole on said upper, and
   stripping the resulting soled shoe from said mold.

2. A method according to claim 1 wherein the said resulting rubbery mold is provided with the said flexible lip by stripping the said rubbery mold from the said mold from and trimming the said rubbery portion thereof which had overlain the top of the sole portion of said form along a curved plane parallel to said sole edge periphery of said form to the desired size.

3. A method according to claim 1 wherein the said mold form comprises a replica of a shoe sole extending outwardly from a curved planar surface contoured to match the curved planar surface of a lasted shoe upper corresponding to said shoe sole, said contoured surface being slightly displaced above the upper surface of said sole.

4. A method according to claim 1 wherein said mold is flexed inwardly into tight sealing engagement with said shoe upper after the shoe upper is placed on the mold, and then is relaxed after curing of said composition to facilitate stripping of the soled shoe from the mold.

5. A method according to claim 1 wherein said mold is formed from a non-cellular crosslinked polyurethane elastomer which is cast as a liquid reaction mixture of an organic polyalkylene ether glycol, an organic triol, a diamine, and an organic diisocyanate which are coreacted with one another in the presence of a catalytic quantity of an organic compound of a polyvalent metal in the presence of which the mixture converts to a solid crosslinked rubber free of further reactive groups within a period of no more than about 1 hour at a temperature no higher than about 150° F.

6. A method according to claim 5 wherein said elastomer is the reaction product of an aromatic diisocyanate, a polyalkylene ether glycol having an average molecular weight of between about 750 to 4,500, said triol being present in an amount sufficient to provide about one crosslink for each 5,000 to 100,000 average molecular weight of elastomer, said organic compound being polyol soluble and present in an amount of about 0.05 to about 1 percent by weight of the reaction mixture, and said diamine is present in an amount sufficient to provide between about 10 to 50 percent of the active hydrogens in the system.

References Cited

UNITED STATES PATENTS

| | | | |
|---|---|---|---|
| 3,248,454 | 4/1966 | Muller et al. | 260—858 |
| 3,121,431 | 2/1964 | Rosenhaft | 128—595 |
| 3,002,230 | 10/1961 | Stewart | 264—297 |
| 2,401,760 | 6/1946 | Heyroth | 264—221 |
| 3,428,725 | 2/1969 | Delmonte | 264—227 |
| 3,125,617 | 3/1964 | Hoppe | 264—54 |
| 3,018,517 | 1/1962 | Ludwig | 264—45 |
| 2,894,288 | 7/1959 | Brindis | 264—313 |
| 2,621,166 | 12/1952 | Schmidt et al. | 260—75 |

JULIUS FROME, Primary Examiner

T. MORRIS, Assistant Examiner

U.S. Cl. X.R.

18—47; 264—244, 327